(12) United States Patent
Winker

(10) Patent No.: US 6,843,631 B2
(45) Date of Patent: Jan. 18, 2005

(54) NUT AND METHOD FOR ITS FABRICATION

(76) Inventor: Alexander Winker, Ahornweg 11, 78549 Spaichingen (DE)

( * ) Notice: Subject to any disclaimer, the term of this patent is extended or adjusted under 35 U.S.C. 154(b) by 0 days.

(21) Appl. No.: 10/040,305

(22) Filed: Nov. 6, 2001

(65) Prior Publication Data
US 2002/0106263 A1 Aug. 8, 2002

(30) Foreign Application Priority Data
Nov. 6, 2000 (DE) .......................... 100 54 896

(51) Int. Cl.⁷ .............................. F16B 43/00
(52) U.S. Cl. ........................ 411/533; 411/432
(58) Field of Search ................ 411/533, 534, 411/432, 183; 29/509, 512; 301/35.622, 35.624

(56) References Cited

U.S. PATENT DOCUMENTS

| 2,588,372 | A | * | 3/1952 | Erb .......................... 411/432 |
| 4,431,353 | A | * | 2/1984 | Capuano .................... 411/11 |
| 4,969,788 | A | | 11/1990 | Goiny |
| 4,971,498 | A | * | 11/1990 | Goforthe ................... 411/134 |
| 5,042,880 | A | * | 8/1991 | Garuti et al. ........... 301/35.624 |
| 5,597,279 | A | | 1/1997 | Thomas et al. |
| 5,871,402 | A | | 2/1999 | Bächle |
| 5,904,460 | A | * | 5/1999 | Kawabata ................... 411/155 |
| 6,102,488 | A | * | 8/2000 | Wilson ................... 301/35.623 |

FOREIGN PATENT DOCUMENTS

| GB | 2138529 A | 10/1984 |
| WO | WO 00/27653 | 5/2000 |

* cited by examiner

Primary Examiner—William L. Miller
(74) Attorney, Agent, or Firm—Kriegsman & Kriegsman

(57) ABSTRACT

The present invention concerns a nut (1) with a nut body (10) having an enlarged shoulder (15) and a turning plate (20) that is rotationally and inseparably arranged on the nut body, wherein the turning plate is shoved onto the nut body and secured by means of a locking element. According to the invention, the locking element is fashioned as a bead (26) provided on the nut body (10), so that the turning plate (20) is arranged between the enlarged shoulder (15) and the bead (26). Moreover, the present invention concerns a method for fabrication of such a nut, wherein the nut body (10) and the turning plate (20) are made by massive forming and, before or after shoving on the turning plate (20), an upsetting (26) is formed by pressing in the nut body (10), or during the fabrication of the nut body (10) a bead (26) is formed as a single piece in the nut body, so that the turning plate (20) is positioned between the enlarged shoulder (15) and the upsetting or the bead (26).

13 Claims, 2 Drawing Sheets

NUT AND METHOD FOR ITS FABRICATION

BACKGROUND OF THE INVENTION

The present invention concerns a nut, as well as a method for its fabrication, the nut being of the type comprising a nut body and a turning plate, the nut body having an enlarged shoulder, the turning plate being capable of rotating and being inseparably arranged on the nut body, the turning plate being shoved onto the nut body and secured by means of a locking element.

A nut of this kind is known from DE 3,325,255 02. This publication discloses a wheel nut of metal or a metal alloy for utility vehicles with a nut body and a turning plate fashioned as a pressing plate. The turning plate is shoved onto the nut body and anchored so that it can easily turn on the nut body, but cannot be stripped off. This is assured by locking means, which are provided on the outer circumference of the nut body and on the inner circumference of the pressing plate and which engage with each other so that the turning plate is inseparably connected to the nut body. These locking means essentially consist of recesses or grooves worked into the nut body and the turning plate.

The nut body and the turning plate are fabricated in familiar fashion by massive forming, such as cold and/or hot pressing. However, the locking means must be introduced into the nut body and the turning plate subsequent to the pressing, each of them in an additional work step, by machining, such as lathe work. But this type of fabrication is costly and time-consuming.

SUMMARY OF THE INVENTION

The object of the present invention thus consists in furnishing a nut of the aforementioned kind as well as a method for its fabrication that is easier and less expensive to produce.

The solution consists of a novel nut, as well as a fabrication method for said nut. The nut according to the invention has only one locking element, namely, a bead arranged on the nut body. This spares at least one lathe procedure, namely, the subsequent machining of the turning plate. The bead can be produced by familiar lathe procedure in the nut body. However, the fabrication method according to the invention calls for the bead to be produced in the nut body by pressing. Thus, the method according to the invention consists only of pressing processes. There is no cutting type machining. Since pressing is substantially less expensive than a cutting type machining, the method according to the invention represents an especially simple, quick and cheap possibility of fabricating such nuts, which is therefore especially suitable for mass production.

The turning plate can be shoved onto the nut body before or after making the bead. In the latter case, the turning plate is shoved or forced across the bead with an expenditure of force, generally mechanical force. This can be advantageous if the surfaces of the nut body and/or the turning plate are provided with a coating, such as a corrosion protection. When the turning plate is shoved onto the nut body before applying the bead, the nut body and the turning plate must be provided with the same surface coating. But when the nut body and the turning plate are to have different surface coatings, the coating must be done before shoving the turning plate onto the nut body. But then the bead must be pressed into the nut body before the coating, or else the surface coating would be damaged and the corrosion protection no longer guaranteed.

Advantageous modifications will hereinafter be described. The nut body can have a base body and a neck piece, with the turning plate arranged on the neck piece. There can be a conical surface which closes off the neck piece; but this is not absolutely necessary. There can also be configurations without a conical surface. The bead is preferably formed on the neck piece. A notch can be pressed into the conical surface and/or into the neck piece, being bounded by the bead at its edge facing the turning plate, There are also other ways of forming the bead by pressing, for example, the neck piece is provided with a material overhang, such as a slightly conical contour, on its outside during the pressing of the nut body, and this is then pressed into a bead. Of course, the bead can also be formed as a single piece when pressing the nut body.

The turning plate preferably has a cylindrical region of surface along its inner surface, which abuts against the neck piece of the nut body. Yet the turning plate can also have a slightly conical surface region along its inner surface. Moreover, it can have a bevel or chamfer at the end of the cylindrical or slightly conical region of surface that is afterwards opposite the base body. This is especially advantageous when the turning plate is shoved onto the nut body after forming the bead. The slightly conical configuration or the bevel or chamfer facilitates the shoving on of the turning plate.

Another preferred modification consists in that the enlarged shoulder has a conical underside at its side facing the neck piece and the turning plate has a conical region of surface along its inner surface, which makes contact with the conical underside of the enlarged shoulder. The conical underside and the conical region of surface thus represent mutual friction surfaces, against which the turning plate can move. The turning plate can be somewhat trapezoidal in cross section. Moreover, the base body can have a cap.

The nut according to the present invention is suitable for use as a wheel nut for motor vehicles, for example.

BRIEF DESCRIPTION OF THE DRAWINGS

An example of embodiment of the present invention will be explained more closely hereafter by means of the enclosed drawings. These show.

DETAILED DESCRIPTION OF PREFERRED EMBODIMENTS

Figure 1:
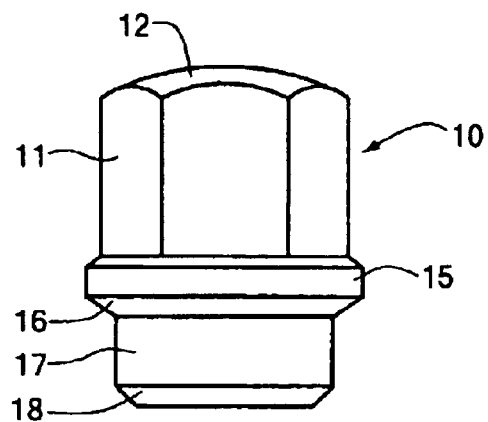
FIG. 1 a schematic, not true-to-scale side view of a nut body for a nut according to the invention.
Figure 2:
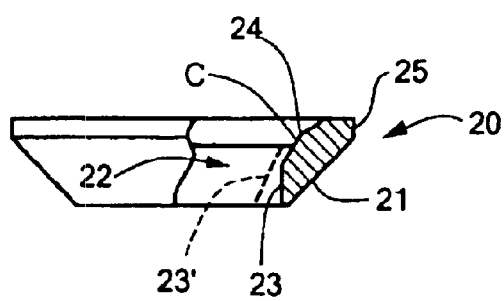
FIG. 2 a schematic, not true-to-scale, partially cut-away side view of a turning plate for the nut body illustrated in FIG. 1.
Figure 3:
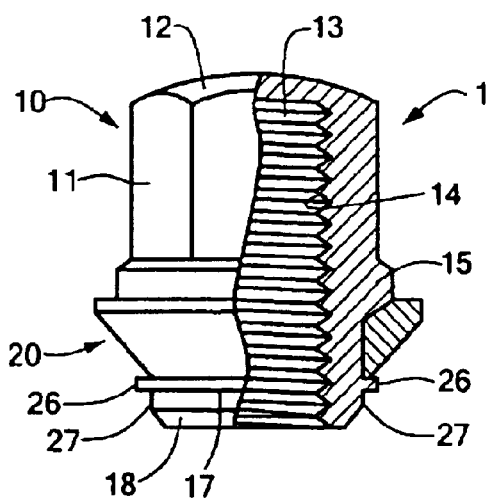
FIG. 3 a schematic, not true-to-scale, partially cut-away side view of a nut according to the invention.

The example of embodiment of a securing nut 1 according to the invention, depicted in FIGS. 1 through 3, serves as a wheel nut for motor vehicles consists of a nut body 10 and a turning plate 20. The nut body 10 has a base body 11, which in the example of embodiment is provided with a cap 12 at the end away from the wheel, The nut body 10, furthermore, has a borehole 13 with an inner thread 14. Of course, it is also possible to omit the cap 12, so that the nut body 10 has a continuous borehole 13. The base body 11 in the example of embodiment has a hexagonal shape for a corresponding wheel wrench; but of course the shape of the base body 11 in this respect can be however desired.

At the end of the base body 11 facing the wheel the nut body 10 has an enlarged shoulder 15 with a conical underside 16, serving as a contact surface for the inner surface of the turning plate 20 (see below). After this conical underside 16 comes a neck piece 17 The neck piece 17 is closed off by a conical surface 18.

The turning plate 20 is somewhat trapezoidal in cross section with a conical outer surface 21. The inner surface 22 of the turning plate 20 consists of a cylindrical surface region 23, which makes contact with the neck piece 17 of the nut body 10, and a conical surface region 24 which makes contact with the conical underside 16 of the enlarged shoulder 15 of the nut body 10. The conical surface region 24 is bounded by a narrow shoulder 25 at its outer edge.

The hatched line in FIG. 2 indicates that instead of the cylindrical surface region 23 one can have a slightly conical surface region 23'. At the upper end of the cylindrical 23 or slightly conical surface region 23', in the example of embodiment, i.e., at the transition from the cylindrical 23 or slightly conical surface region 23' to the conical surface region 24 there can be provided a small bevel or chamfer C. These configurations facilitate the shoving of the turning plate 20 onto the neck piece 17 after making the bead 26 (see further below).

The turning plate 20 and the nut body 10 are produced in familiar fashion by massive forming, such as cold and/or hot pressing. Both the outer surface of the neck piece 17 and the cylindrical surface region 23 or the slightly conical surface region 23' of the turning plate 20 are completely smooth after the pressing process. In order to assemble the nut 10, the turning plate 20 is shoved onto the neck piece 17 of the nut body 10, until the conical surface region 24 of the turning plate 20 lies against the conical surface 18. However, without further securement, the turning plate 20 could be stripped off from the neck piece 17 once again. Such securement, according to the invention, is a bead 26 located between the turning plate 20 and the conical surface 18, against which the end of the turning plate 20 facing the wheel abuts, so that it cannot be stripped off from the neck piece 17.

The turning plate 20 can be shoved onto the neck piece 17 before or after making the bead 26. In the latter case, the turning plate 20 is shoved or forced past the bead 26 with some expenditure of force, generally mechanical. It is advantageous to have a slightly conical surface region 23' and/or a bevel or chamfer C at the upper end of this surface region, because this facilitates the shoving on of the turning plate 20. If a slightly conical surface region 23' is provided, then its inner diameter at the top, i.e., at the end facing the base body 11, is equal to or somewhat larger than the diameter of the bead 26. The inner diameter at the bottom, i.e., at the end facing the bead 26, is less than the diameter of the bead 26.

Figure 4:
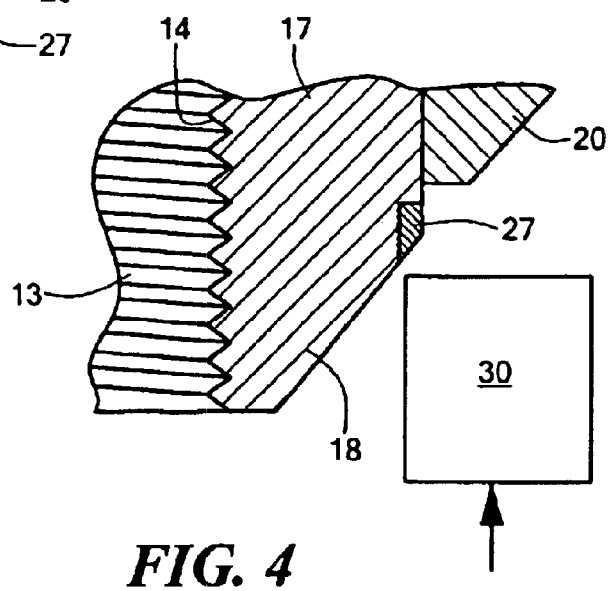
FIG. 4 a schematic representation of the fabrication steps to make the nut illustrated in FIG. 3 and FIG. 5 nuts according to a first embodiment of the method according to the invention.
Figure 5:
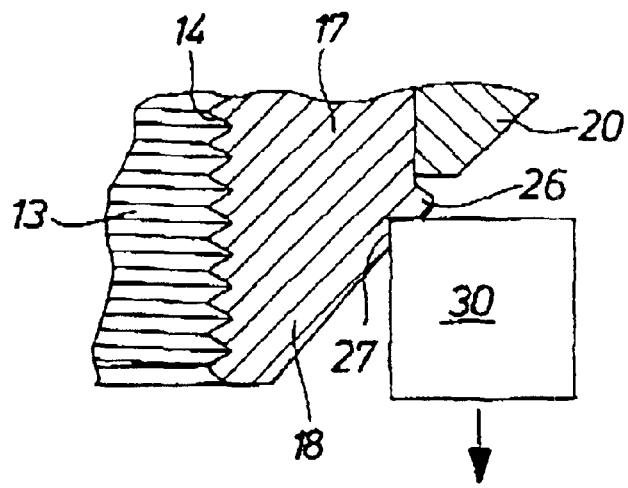

The bead 26 can be formed directly in the nut body 10 during the pressing of the latter. But it can also be produced by an upsetting formed in the conical surface 18 and/or in the neck piece 17, as is shown schematically in FIGS. 4 and 5. Using a tool 30, such as a die, a somewhat rectangular notch 27 is made in the conical surface 18 and/or the neck piece 17. The excess material forced out from the notch 27 by the pressing process forms an upsetting or a bead 26 above the notch 27. The bead 26 thus bounds the notch 27 at its edge facing the turning plate 20.

Figure 6:
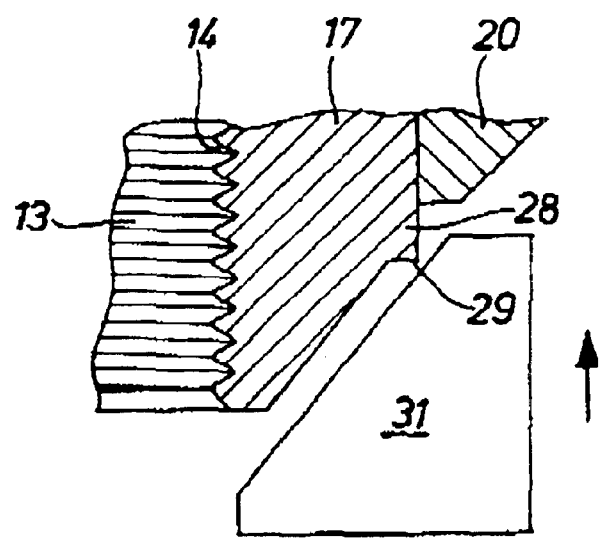
FIG. 6 a schematic representation of the process steps for making the nut illustrated in FIG. 3 and FIG. 7 nuts according to a second embodiment of the method according to the invention.
Figure 7:
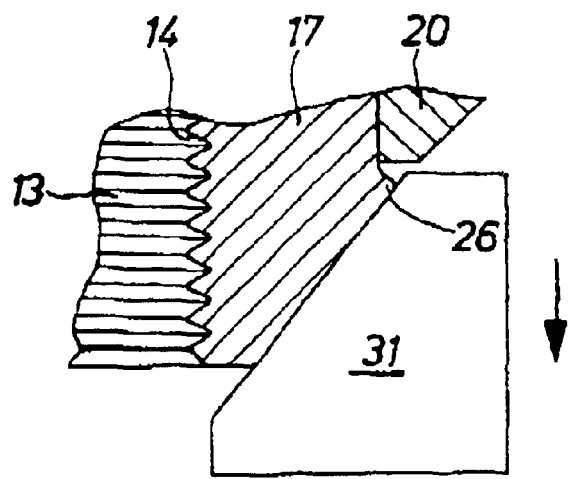

Another possibility of forming the bead 26 in the neck piece 17 is shown schematically in FIGS. 6 and 7. Here, while pressing the nut body 10, a material overhang 28 is also formed, which is slightly conical in its outer contour or which has a small chamfer 29 or beveling at its end facing the base body 11. The material overhang 28 is preferably formed at the transition from the conical surface 18 to the neck piece 17. This material overhang 28 is forced upward in the direction of the base body 11 with a suitable tool 31, so that a bead 26 is formed—in the sample embodiment, at the neck piece 17.

The method according to the invention for production of the described nut 1 thus consists only of pressing processes and is therefore simple, cheap, and suitable for the mass production of such nuts, especially for automotive wheel nuts that are produced in large numbers.

What is claimed is:

1. Nut (1) comprising a nut body (10) and a turning plate (20), the nut body (10) comprising an enlarged shoulder (15), a neck piece (17) extending from the enlarged shoulder (15), and a conical surface (18) tapering inwardly downwardly from the neck piece (17) and closing off the neck piece (17) at an end opposite the enlarged shoulder (15), the turning plate (20) being inseparably and rotatably arranged on the nut body (10), wherein the turning plate (20) is shoved onto the nut body (10) and secured by means of a locking element, the locking element being fashioned as a bead (26) provided on at least one of said conical surface (18) and said neck piece (17) of the nut body (10), so that the turning plate (20) is arranged between the enlarged shoulder (15) and the bead (26).

2. Nut according to claim 1, further characterized in that the bead is fashioned as an upsetting (26) formed by a pressing process or it is formed as a single piece on the nut body.

3. Nut according to claim 1, further characterized in that the nut body (10) further has a base body (11) and wherein the turning plate (20) is arranged on the neck piece (17).

4. Nut according to claim 3, further characterized in that the enlarged shoulder (15) has a conical underside (16) at its end facing the neck piece (17) and the turning plate (20) has a conical surface region (24) along an inner surface (22), which makes contact with the conical underside (16) of the enlarged shoulder (15).

5. Nut according to claim 3, further characterized in that the base body (11) has a cap (12).

6. Nut according to claim 1, further characterized in that a notch (27) is formed by pressing in at least one of the conical surface (18) and the neck piece (17), which is bounded by the bead (26) on its edge facing the turning plate.

7. Nut according to claim 1, further characterized in that the turning plate (20) has a cylindrical surface region (23) along an inner surface (22), which abuts against the neck piece (17).

8. Nut according to claim 1, further characterized in that the turning plate (20) has a slightly conical surface region (23') along an inner surface (22).

9. Nut according to claim 8, further characterized in that a bevel or chamfer is provided at the end of the slightly conical surface region (23') facing a base body.

10. Nut according to claim 1, further characterized in that the turning plate (20) is trapezoidal in cross section.

11. Nut according to any one of the preceding claims wherein said nut is a wheel nut for motor vehicles.

12. Nut (1) comprising a nut body (10) and a turning plate (20), the nut body (10) comprising an enlarged shoulder (15), a neck piece (17) extending from the enlarged shoulder (15'), and a conical surface (18) tapering inwardly downwardly from the neck piece (17) and closing off the neck niece (17) at an end opposite the enlarged shoulder (15), the turning plate (20) being inseparably and rotatably arranged on the nut body (10), wherein the turning plate (20) is shoved onto the nut body (10) and secured by means of a locking element, the locking element being fashioned as a bead (26) is formed on the neck piece (17) of the nut body (10), so that the turning plate (20) is arranged between the enlarged shoulder (15) and the bead (26).

13. Nut (1) comprising a nut body (10) and a turning plate (20), the nut body (10) comprising an enlarged shoulder (15), a neck piece (17) extending from the enlarged shoulder (15), and a conical surface (18) tapering inwardly downwardly from the neck niece (17) and closing off the neck piece (17) at an end opposite the enlarged shoulder (15), the turning plate (20) being inseparably and rotatably arranged on the nut body (10), wherein the turning plate (20) is shoved onto the nut body (10) and secured by means of a locking element, the locking element being fashioned as a bead (26) formed at the transition from the conical surface (18) to the neck piece (17).

\* \* \* \* \*